Jan. 25, 1966  R. L. LICH  3,231,257
FLUID SPRING DEVICE
Filed Nov. 4, 1963
2 Sheets-Sheet 1

INVENTOR
RICHARD L. LICH
BY Bedell & Burgess
ATTORNEYS.

Jan. 25, 1966    R. L. LICH    3,231,257
FLUID SPRING DEVICE

Filed Nov. 4, 1963    2 Sheets-Sheet 2

INVENTOR.
RICHARD L. LICH
BY Bedell & Burgess
ATTORNEYS

United States Patent Office 3,231,257
Patented Jan. 25, 1966

3,231,257
FLUID SPRING DEVICE
Richard L. Lich, Pasadena Hills, Mo., assignor to General Steel Industries, Inc., Granite City, Ill., a corporation of Delaware
Filed Nov. 4, 1963, Ser. No. 321,127
14 Claims. (Cl. 267—3)

The invention relates to fluid spring suspension systems and consists particularly in means for selectively limiting lateral roll of vehicles incorporating such suspensions.

Fluid springs usually comprise an expansible flexible wall chamber permanently communicating with a rigid wall reservoir chamber of greater volume, the spring rate varying inversely with respect to the combined volumes of the two chambers. With very low rate fluid springs, vehicle body roll may be greater than is encountered with conventional higher rate metal springs, and must be inhibited when vehicles so equipped are operating on tracks with restricted lateral clearances, such as through tunnels, to avoid interference between the vehicle bodies and trackside structures.

Accordingly, the main object of the invention is the provision of a normally soft fluid spring suspension system for vehicles in which substantial vehicle body roll may be selectively prevented by stiffening the springs.

A further object is to provide a fluid spring having an expansible chamber and a rigid chamber, and means for selectively blocking communication between the two chambers to reduce the resiliency, i.e., lower the rate, of the expansible chamber.

The foregoing and additional more detailed objects and advantages will be achieved by the structure described as follows and illustrated in the accompanying drawings, in which.

Figure 1:
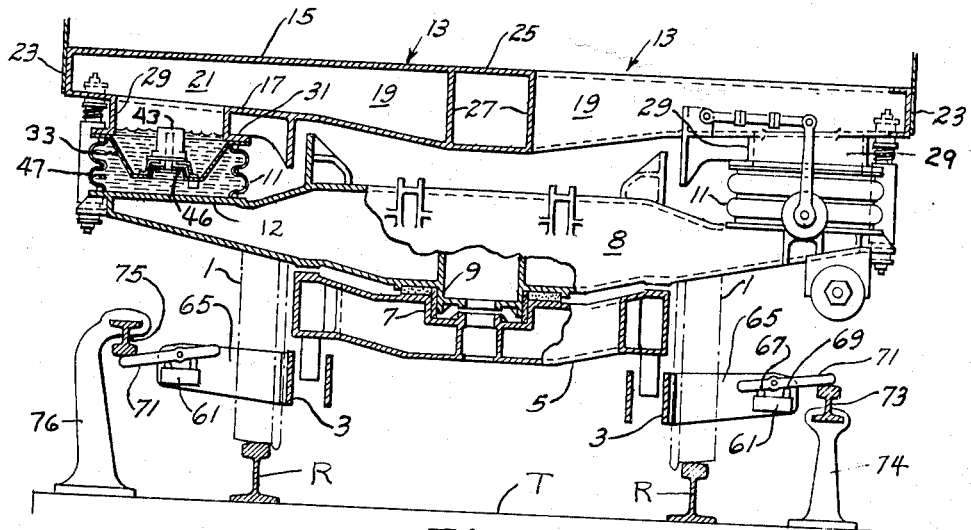
FIG. 1 is a transverse vertical sectional view of a railway car underframe and truck embodying the invention.
Figure 2:
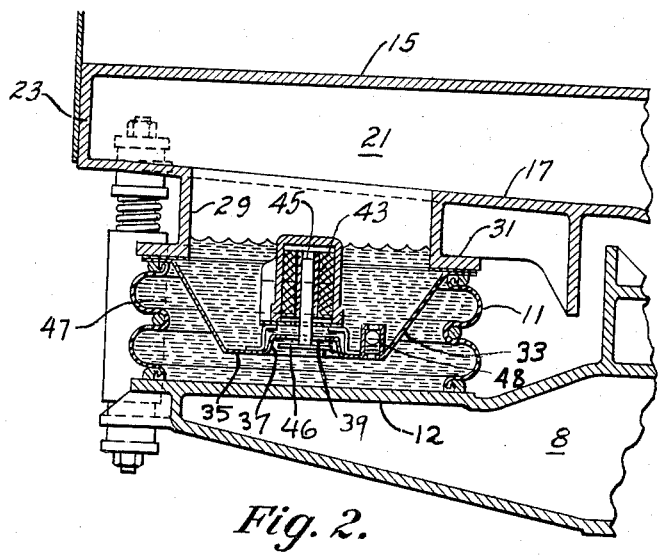
FIG. 2 is an enlarged transverse vertical sectional view of the fluid spring incorporated in the structure illustrated in FIG. 1.

The suspension comprises a truck having wheels 1 supported on the upper surface of track comprising rails R and crossties T, equalizing beams 3 supported from said wheels, a rigid frame 5 supported from the equalizing beams and including a pivot central bearing 7 at its center, and a transverse bolster pivotally mounted on frame 5 by means of a central bearing 9 in mating engagement with truck frame central bearing 7. The truck is constructed generally in accordance with my patent 2,988,015.

For resiliently supporting the car body, both vertically and laterally, upright generally cylindrical flexible bellows members 11 are seated on and sealingly secured to the top walls 12 of bolster 8 adjacent the lateral extremities thereof.

The car body bolster arms 13 are of hollow box-section construction, having spaced top and bottom walls 15 and 17, transversely extending vertical side walls 19 and 21, and outer end walls 23, which may also form part of the car body side sills. At their inner ends bolster arms 13 are secured to center sill 25, the vertical side walls 27 of which define, with the other walls of the bolster arms, a closed chamber. At each of its ends, body bolster bottom wall 17 is apertured and formed with a depending cylindrical rim 29, horizontally flanged at its lower end, as at 31, for sealing attachment to the upper ends of bellows 11, so that the bolster arms form rigid reservoir chambers for the bellows to which they are connected respectively.

Intercalated between the upper ends of bellows 11 and flanges 31 are the peripheral flanges of pan-shaped spring stop members 33, which form, with bellows 11 and bolster top walls 12, a vertically expansible chamber. The central portions of members 33 are of inverted frustoconical shape, with their flat bottoms adapted to engage the upper wall 12 of truck bolster 8, when fluid pressure in the spring falls below a predetermined value, whereby to limit compression of the bellows and support the car body in the event of loss of fluid pressure in the spring.

The flat bottom 35 of stop member 33 is upwardly recessed at 37, centrally ported as at 39 and supports, by means of upstanding brackets, a solenoid 43 spaced above the ported recessed portion of the stop member bottom 35. Armature 45 of solenoid 43 extends downwardly through port 39 and mounts, at its lower end, in spaced relation with the bottom surface of recess 37, a disk-shaped valve member 46 of slightly greater diameter than port 39. The marginal region of value member 46 is adapted to sealingly engage the bottom of recessed wall portion 37 when the solenoid is energized, and thus prevents the passage of fluid through port 39. For facilitating the passage of fluid downwardly through member 33 to assist in equalizing fluid pressure throughout the combined chambers, when valve 46 is opened, without permitting the passage of fluid upwardly from the bellows chamber to the reservoir, ball check valve 48 is provided in bottom wall 35 of member 33.

In the preferred form of the invention, the bellows portion of the spring is filled to capacity with a liquid 47, and the reservoir formed in the bolster arm is filled with gas such as compressed air, so that, in operation, vertical forces between the car body and truck bolster tending to vary the height of the bellows, cause vertical movements of exposed surface of liquid 45 against the air in the reservoir, the compressibility of which provides the resiliency. With a substantially incompressible fluid, liquid 45, in the flexible bellows part of the springs, the individual springs at both sides of the car can be rendered nonresilient by closing valves 39, thereby preventing body roll.

Figure 3:
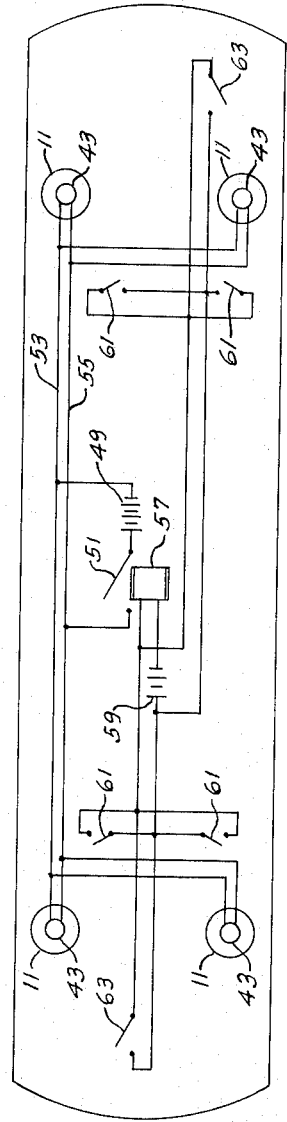
FIG. 3 is a schematic diagram of the valve electrical control circuit.

Solenoid valves 39 can be controlled either manually or automatically responsive to prearranged conditions along the route of movement of the vehicle by the electrical circuit schematically illustrated in FIG. 3. The main circuit comprises a source of electric current 49, a relay switch 51, and electrical conduits 53 and 55 to which solenoids 43 are connected in parallel with each other so that when switch 51 is closed, all the solenoids will be energized, closing all valves 46, and thereby preventing body roll by rendering the fluid springs substantially nonresilient.

The relay electromagnet 57, which actuates switch 51 is energized by a circuit including a source of power, truck-mounted, rail actuated switches 61, and manual switches 63 in the motorman's cabs. Switches 61 and 63 are all connected in parallel with each other so that closure of any one of them will close the relay circuit, causing closure of switch 51, energization of solenoids 43, and closure of valves 46.

Truck-mounted switches 61 are mounted on brackets 65, which are secured to truck equalizers 3 and extend transversely outboard therefrom. Switches 61 are of the plunger actuated toggle type, the outer plunger being depressible to close the switch. The plungers of each switch are actuated by a lever 71 which is fulcrumed, between the plungers, at 69 on bracket 65, and extends laterally outwardly from the extremity thereof. For automatically closing switches 61 at the beginning of trackage with restricted lateral clearances, short lengths of under-running third rail 73, adapted to raise switch levers 71 to the switch-close position, are carried by brackets 74 mounted on the ends of crossties T at the beginning of restricted lateral clearance trackage. At the end of such trackage, to open switches 61, short lengths of over-running third rail 75, adapted to lower switch levers 71 to their switch-open position are carried by brackets 76 mounted on the crossties.

Figure 4:
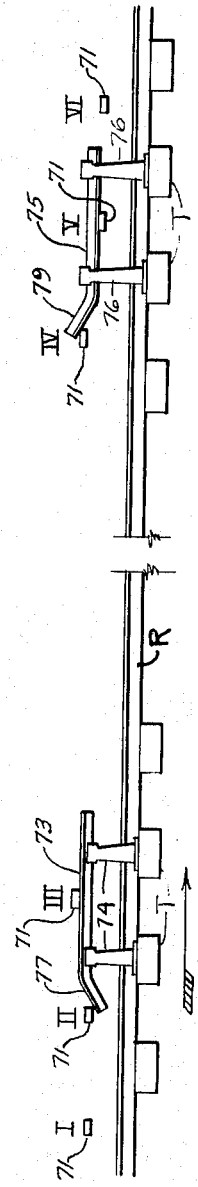
FIG. 4 is a schematic side view of a section of track including restricted lateral clearance and switch-actuating rail segments.

A schematic side elevation of a length of track including a restricted lateral clearance section is illustrated in FIG. 4. The end of switch lever 71 is shown in normal lower, or closed positions I and II as the car approaches under-running third rail section 73, the leading end of which is bent downwardly as at 77 to underlyingly engage lever 71 and raise it to switch-closed position III where it remains until position IV, at the end of the restricted clearance section, where it engages the upwardly bent leading end 79 of over-running third rail 75, which overlyingly engages lever 71 and moves it downwardly to the normal switch-open poistion V. The switch lever continues on at this level, as shown in position VI.

Manual switches 63 enable the operator of the train to selectively prevent car roll where lateral clearances are restricted temporarily, and no actuating rail sections are provided, as for example, when passing a freight car carrying an excessively wide load.

Operation of the system is as follows: Truck-mounted switch levers 71 are normally in the lowered position shown on the left side of FIG. 1 and at I, II in FIG. 4, relay electromagnet 57 is deenergized and switch 51 in the main solenoid circuit is open so that solenoids 43 are deenergized and valves 46 are in their lowermost positions providing free access through ports 39 in spring stop members 33. In this condition relatively free passage of liquid is permitted through ports 39 so that vertical movements of car underframe relative to truck bolster are permitted through flexure of bellows 11, such movements being cushioned by the air compressed by the upper surfaces of liquid 47 in the four springs. When the car approaches the restricted lateral clearance trackage, the underside of truck-mounted lever 71 is engaged by the downwardly bent leading edge of under-running third rail section 73 and is raised to the switch-closed position, relaying pressure on switch opening plunger 69 and pressing downwardly on switch closing plunger 67 of switch 61. This closes a circuit including power source 59 and relay electromagnet 57, thus energizing the relay and closing relay switch 51 in the main solenoid circuit. With switch 51 closed, solenoids 43 are simultaneously energized, causing valve closure members 46 to move upwardly to close ports 39 in spring stop members 33 and thus prevent the passage of fluid out of the chambers comprising flexible bellows 11, spring stops 33 and the upper surface of truck bolster 8. Since liquid is substantially incompressible, while valve 46 is closed the liquid confined in this chamber prevents compression of the chamber and since this occurs in springs spaced transversely of the car body roll is prevented while the car is operating on the restricted lateral clearance track. When the car has passed through the restricted lateral clearance zone the upper surface of lever 71, still in the uppermost, or switch-closed, position, is engaged by the lower surface of upwardly bent leading end portion 79 of over-running third rail section 75 and is caused to move downwardly to the switch-open position thereby urging outer switch-opening plunger 69 downwardly to the switch open position and permitting plunger 67 to move upwardly to its switch-open position. This breaks the circuit through relay 57 permitting switch 51 to open and break the main circuit through solenoids 43 which are thereby deenergized permitting valves 46 to return to their normal position opening ports 39 and permitting the relatively free flow therethrough of liquid 47 the upper surfaces of which may move upwardly and downwardly to accommodate vertical movements of the body on flexible bellows 11, such movements being yieldably and resiliently resisted by compression of the air in the body bolster air chambers.

In the event that it is desirable to prevent roll while operating on track not provided with third rail sections 73 and 75, this can be done by manually closing one of the switches 63, which in turn will cause energization of relay 57, closure of switch 51 and energization of solenoid 43 to close valve member 46 and confine the liquid in the flexible bellows chambers, thereby preventing roll as long as switches 63 are closed. When the restriced lateral clearance zone is passed, the springs can be returned to their normal resilient operation by opening switches 63.

It will be understood that liquid 47 may be eliminated and the entire system filled with gas, in which case the resiliency of the spring will be reduced due to the reduction in its effective volume to the chamber defined by member 33, bellows 11 and bolster top wall 12 when valve 46 is closed.

The details of the system may be varied substantially without departing from the spirit of the invention and the exclusive use of those modifications coming within the scope of the appended claims is contemplated.

What is claimed is:

1. A vehicle fluid spring suspension comprising wheel-supported structure, a pair of upright flexible wall chambers spaced apart transversely of the vehicle and carried by said wheel-supported structure, separate rigid wall chambers communicating individually with said flexible wall chambers, a liquid fully occupying each of said flexible wall chambers and part of each of said rigid chambers, a gas occupying the remainder of each of said rigid wall chambers, normally open valves between associated flexible and rigid wall chambers, said valves being closable to prevent communication between said flexible and rigid wall chambers, and cooperating elements on the vehicle and in fixed positions spaced apart along the route of the vehicle but separate from the vehicle supporting surface for selectively closing and opening said valves when the vehicle passes said fixed elements.

2. A vehicle fluid spring suspension comprising wheel-supported structure, a pair of upright flexible wall chambers spaced apart transversely of the vehicle and carried by said wheel-supported structure, separate rigid wall chambers, communicating individually with said flexible wall chambers, fluid occupying said flexible and rigid wall chambers, normally open valves between associated flexible and rigid wall chambers, said valves being closable to prevent communication between said flexible and rigid wall chambers, and cooperating elements on the vehicle and in fixed positions spaced along the route of the vehicle but separate from the vehicle supporting surface for selectively closing and opening said valves when the vehicle passes said fixed elements.

3. A vehicle fluid spring suspension according to claim 2 in which said flexible wall chambers are at a lower level than said rigid wall chambers and the fluid occupying said flexible wall chambers is a liquid.

4. A vehicle fluid spring suspension according to claim 2, in which wall structure separates each of said flexible wall chambers from the associated rigid wall chamber and there is a port in said wall structure providing communication between chambers, one of said valves being located in each of said ports.

5. A vehicle fluid spring suspension according to claim 4 in which each said port is circular and each said valve comprises a disk normally spaced axially from said port and adapted, upon closure, to seat against the margin of said port.

6. A vehicle fluid spring suspension according to claim 5 in which said wall structure mounts a solenoid in axial alignment with said port and disk, the armature of said solenoid forming a stem on said disk.

7. A vehicle fluid spring suspension according to claim 4 in which said flexible wall chamber is circular in plan and said wall structure is of frusto-conical shape substantially co-peripheral with said flexible wall chamber and protruding axially thereinto, said port being formed in the central portion of said frusto-conical wall structure.

8. A vehicle fluid spring system according to claim 4 including a normally deenergized solenoid mechanically connected to said valve and adapted to close said valve when energized.

9. A vehicle fluid spring system according to claim 8 including a common electrical circuit for all the valves of a vehicle.

10. A vehicle fluid spring system according to claim 9 in which said circuit includes a source of electric power and normally open means for selectively closing said circuit to energize all said solenoids and close all said valves.

11. A vehicle fluid spring suspension comprising wheel-supported structure, a pair of upright flexible wall chambers spaced apart transversely of the vehicle and carried by said wheel-supported structure, separate rigid wall chambers communicating individually with said flexible wall chambers, fluid occupying said flexible and rigid wall chambers, means for selectively preventing communication between said flexible and rigid wall chambers, wall structure separating each of said flexible wall chambers from the associated rigid wall chamber, a port in said wall structure providing communication between said chambers, said means for selectively preventing communication comprising a normally open valve in said port, a normally deenergized solenoid mechanically connected to said valve and adapted to close said valve when energized, a common electrical circuit for all the valves of a vehicle, said circuit including a source of electric power and normally open means for selectively closing said circuit to energize all said solenoids and close all said valves, said normally open means including a switch mounted on said vehicle and having an element movable between open and closed positions, and fixed structure along the route of movement of the vehicle operably engageable with said switch elements.

12. A vehicle fluid spring system according to claim 11 in which said switch is mounted on said spring supporting structure.

13. A vehicle fluid spring system according to claim 11 in which said normally open means also include a source of power and a relay in series with each other and with said switch and a second normally open switch in said circuit, said second switch being connected to said relay whereby to close when said relay is energized and thus energize the valve solenoids and close the valves.

14. A vehicle fluid spring system according to claim 13 in which there is a normally open manually actuable switch on the vehicle in parallel with said fixed structure-actuated switches.

References Cited by the Examiner
UNITED STATES PATENTS

| | | |
|---|---|---|
| 2,356,093 | 8/1944 | Sampietro et al. _____ 267—64 |
| 2,762,633 | 9/1956 | Gouirand _____ 267—65 X |
| 2,901,241 | 8/1959 | Lautzenhiser et al. ____ 267—11 |
| 2,912,234 | 11/1959 | Candlin _____ 267—3 |
| 2,929,640 | 3/1960 | Faiver. |
| 2,966,366 | 12/1960 | Moulton _____ 267—65 X |

FOREIGN PATENTS 835,107   5/1960   Great Britain.

OTHER REFERENCES

Schmidt et al.: German application 1,087,466, printed Aug. 18, 1960 (K1.63C 41).

ARTHUR L. LA POINT, *Primary Examiner.*